(12) United States Patent
Carrara et al.

(10) Patent No.: US 8,678,170 B2
(45) Date of Patent: Mar. 25, 2014

(54) DEVICE FOR DIVIDING A SINGLE FILE OF PRODUCTS INTO AT LEAST TWO FILES

(75) Inventors: Marco Carrara, Stiore di Monteveglio (IT); Daniele Civolani, Molinella (IT)

(73) Assignee: Azionaria Costruzioni Macchine Automatiche A.C.M.A. S.p.A. (IT)

( * ) Notice: Subject to any disclaimer, the term of this patent is extended or adjusted under 35 U.S.C. 154(b) by 106 days.

(21) Appl. No.: 13/121,744

(22) PCT Filed: Oct. 26, 2009

(86) PCT No.: PCT/IB2009/054714
§ 371 (c)(1),
(2), (4) Date: Mar. 30, 2011

(87) PCT Pub. No.: WO2010/049869
PCT Pub. Date: May 6, 2010

(65) Prior Publication Data
US 2011/0180371 A1    Jul. 28, 2011

(30) Foreign Application Priority Data
Oct. 29, 2008   (IT) .................................. BO08A0662

(51) Int. Cl.
*B65G 47/64*   (2006.01)
(52) U.S. Cl.
USPC ...................... 198/369.1; 198/369.5; 198/352
(58) Field of Classification Search
USPC ................... 198/348, 351, 352, 369.1, 369.5
See application file for complete search history.

(56) References Cited

U.S. PATENT DOCUMENTS

| | | | | |
|---|---|---|---|---|
| 3,604,552 A * | 9/1971 | Marshall | ........................ | 198/436 |
| 4,284,187 A * | 8/1981 | Kramer et al. | ................ | 198/435 |
| 4,424,966 A * | 1/1984 | Chandhoke | .................... | 271/302 |
| 4,754,867 A * | 7/1988 | De Anda | .................... | 198/464.2 |
| 5,421,446 A | 6/1995 | Koch et al. | | |
| 5,772,000 A * | 6/1998 | Serres | ........................ | 198/369.5 |
| 5,984,078 A * | 11/1999 | Bonnet | ...................... | 198/370.1 |
| 6,082,521 A * | 7/2000 | Maier et al. | ................ | 198/349.6 |
| 6,227,377 B1 * | 5/2001 | Bonnet | .......................... | 209/650 |
| 8,079,457 B2 * | 12/2011 | Heinz | ........................... | 198/435 |
| 2011/0186404 A1 * | 8/2011 | Ambroise et al. | ............ | 198/348 |
| 2011/0272241 A1 * | 11/2011 | Van Haaster et al. | ......... | 198/348 |

FOREIGN PATENT DOCUMENTS

| | | |
|---|---|---|
| DE | 9207724 | 8/1992 |
| EP | 1084968 | 3/2001 |

OTHER PUBLICATIONS

PCT International Search Report and Written Opinion dated Aug. 5, 2010.

* cited by examiner

*Primary Examiner* — Patrick Mackey
(74) *Attorney, Agent, or Firm* — Timothy J. Klima; Shuttleworth & Ingersoll, PLC

(57) ABSTRACT

Products (3) advancing in single file are divided into at least two files by a device comprising a main conveyor (10) from which the products (3) of the single file (7) pass onto a first outfeed conveyor (11) and onto a second outfeed conveyor (12) positioned with infeed ends at different heights, one above the other; the device also comprises a linking conveyor (26) between the main conveyor (10) and the outfeed conveyors (11, 12), consisting in a pair of looped belts (27, 28) presenting outer surfaces faced along a portion of predetermined length with a layer (35) of resilient material, thereby creating a channel (34) by which the main conveyor (10) is linked to the outfeed conveyor (11) positioned uppermost, and along which the products (3) are transferred cyclically to this same conveyor (11).

15 Claims, 4 Drawing Sheets

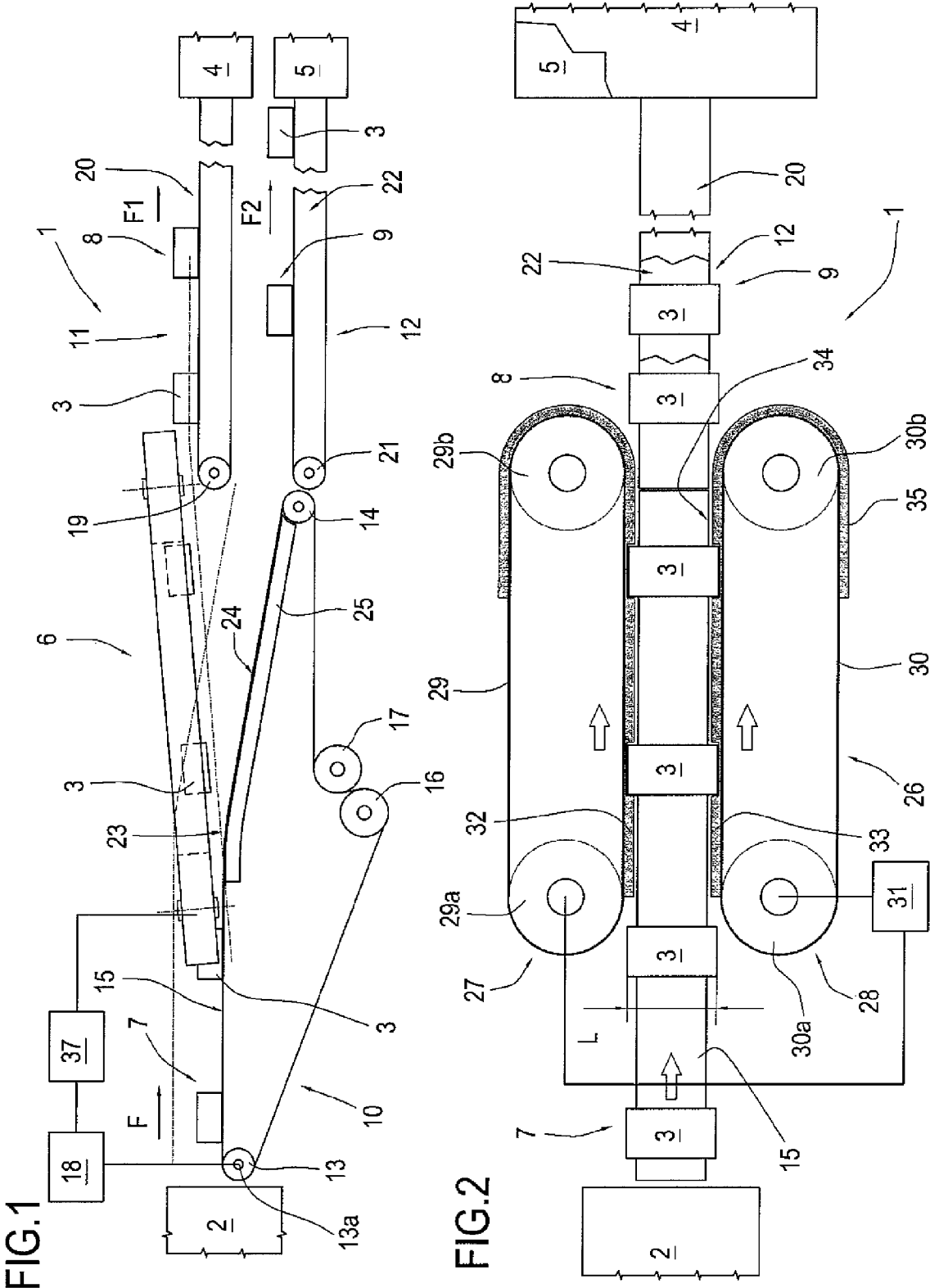

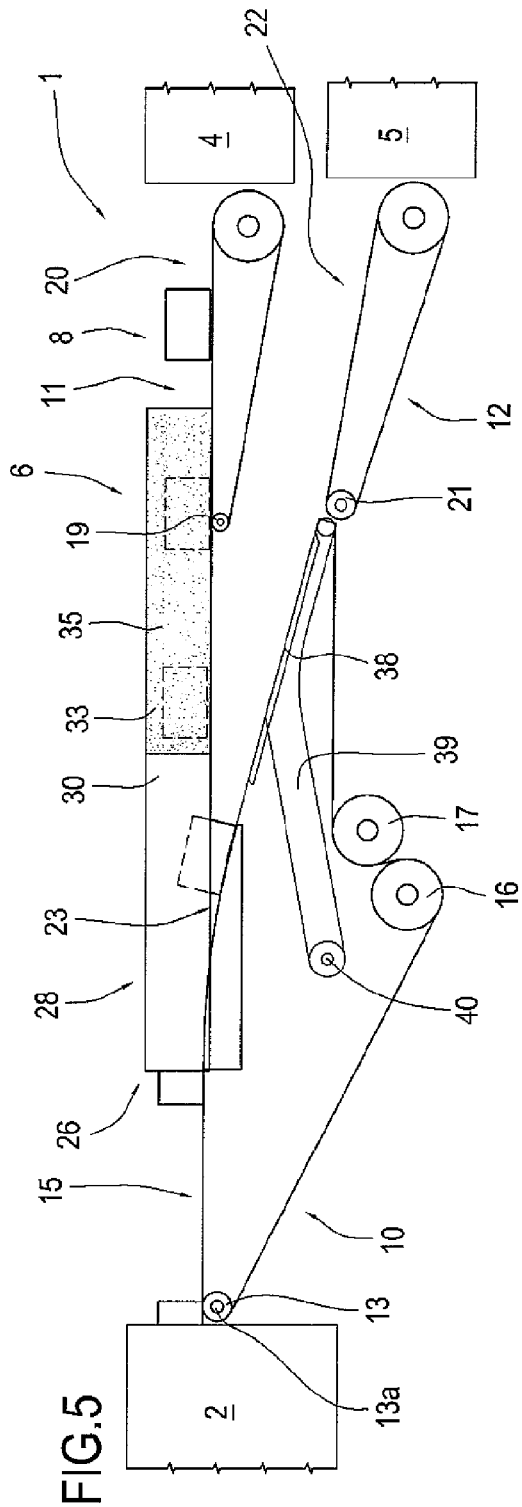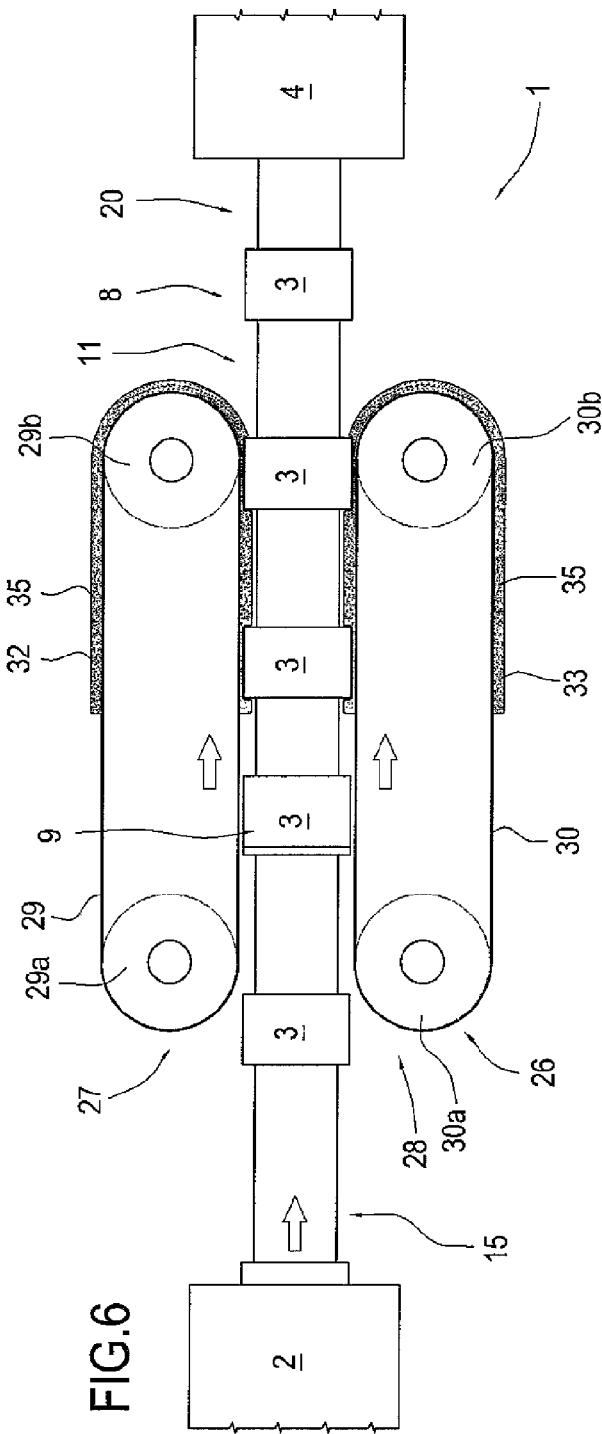

DEVICE FOR DIVIDING A SINGLE FILE OF PRODUCTS INTO AT LEAST TWO FILES

This application is the National Phase of International Application PCT/IB2009/054714 filed Oct. 26, 2009 which designated the U.S. and that International Application was published under PCT Article 21(2) in English.

This application claims priority to Italian Patent Application No. BO2008A000662 filed Oct. 29, 2008 and PCT Application No. PCT/IB2009/054714 filed Oct. 26, 2009, which applications are incorporated by reference herein.

TECHNICAL FIELD

The present invention relates to a device by which a single file of advancing products is divided into at least two files.

Devices of the type in question find application in systems comprising user machines supplied with products, such as machines, for example, by which products are packed, or wrapped, or overwrapped, and are needed in situations where the operating speed of an upstream machine supplying the products is substantially twice that of a single user machine.

Products emerge from the upstream machine arranged in a continuous succession, so as to form a single file or column on a main feed conveyor supplying two distinct outfeed conveyors, each connected to the infeed of a respective user machine.

BACKGROUND ART

In prior art systems, the continuous single file is divided between the two outfeed conveyors through the agency of diverting means by which the flow of products on the main conveyor is directed alternately onto one of the two outfeed conveyors and onto the other.

Devices of this type generally comprise a diverter plate swinging on a vertical pivot between two feed positions in which the products are sent first one way, then another.

Self-evidently, at the moment of being diverted, the products strike against the diverter plate while also sliding against the surface of the conveyors.

The resulting impact and friction do not have damaging consequences, as long as the speeds of the machines and of the conveyors remain within certain limits and the products are not particularly delicate.

Conversely, where operating speeds exceed the limits in question and the products being handled are of a delicate nature, stresses of the type described above will cause denting and abrasion, resulting in the need for an appreciable number of products to be discarded.

Diverter devices of the type mentioned are particularly unsuitable for handling products such as bars of soap, for example, or packets of parallelepiped geometry enveloped in printed and/or coated wrapping material.

DISCLOSURE OF THE INVENTION

The object of the preset invention is to provide a diverter device of the type outlined above such as will cause no damage to products, including particularly delicate products, even when used in machines operating at high output speeds.

The stated object is realized, according to the present invention, in a device as recited in the appended claims.

BRIEF DESCRIPTION OF THE DRAWINGS

The invention will now be described in detail, by way of example, with the aid of the accompanying drawings, in which:

FIG. 1 illustrates a system equipped with the device according to the present invention, viewed from the side and shown partly as a block diagram;

FIGS. 2 and 3 illustrate a detail of the device in FIG. 1, viewed in plan and shown in two different operating configurations;

FIGS. 4 and 5 illustrate a second embodiment of the device according to the invention, viewed from the side and shown in two different operating configurations;

FIG. 6 is a plan view of the device illustrated in FIG. 5;

DETAILED DESCRIPTION OF THE PREFERRED EMBODIMENTS OF THE INVENTION

Figure 3:
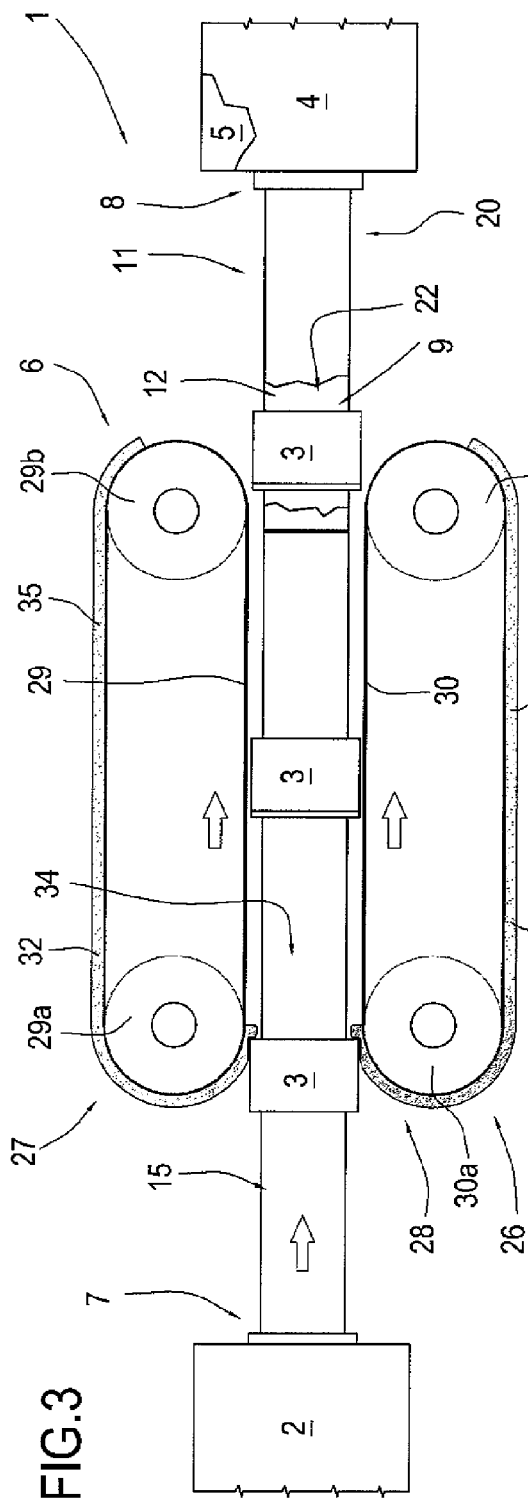

Whilst reference is made explicitly hereinafter to machines for manufacturing and packaging products consisting in bars of soap, the invention is applicable equally to other types of machines and products.

The products might consist in packets, for example, emerging from a packer machine and directed toward a pair of overwrap or cellophane machines.

With reference to FIG. 1, numeral 1 denotes a manufacturing system comprising a production machine, consisting in a machine 2 for moulding substantially parallelepiped bars of soap 3, and two packaging machines 4 and 5 by which the soap bars 3 are wrapped.

Numeral 6 denotes a device, in its entirety, by which a single file 7 of soap bars 3 emerging from the moulding machine 2 is divided into two separate files 8 and 9.

The device 6 comprises a substantially horizontal main belt conveyor 10 connected to the outfeed of the moulding machine 2 and, positioned downstream of the main conveyor 10 along the feed direction indicated by an arrow denoted F, two outfeed belt conveyors 11 and 12 positioned at different heights, extending substantially horizontal and parallel one with another, connected respectively to the infeed of the packaging machine denoted 4 and to the infeed of the packaging machine denoted 5.

More exactly, the main belt conveyor 10 is looped around two top rollers 13 and 14, establishing a transport branch 15, also around a bottom roller 16, and tensioned by a further bottom roller 17 positioned externally of the loop.

The shaft 13a of the roller denoted 13 is coupled to a motor 18 and driven in rotation clockwise, as viewed in FIG. 1, in such a way that the transport branch 15 advances in the direction of the arrow F.

The outfeed conveyor 11 positioned uppermost is looped around two end rollers 19 (one only of which is shown in FIG. 1), to establish a transport branch 20 driven in the direction of the arrow denoted F1 by actuator means not illustrated in the drawings.

Similarly, the lower conveyor 12 is looped around two end rollers 21 (one only of which is shown in FIG. 1), to establish a transport branch 22 driven in the direction of the arrow denoted F2 by actuator means not illustrated in the drawings.

One top roller 14 of the main conveyor 10 is positioned on a level lower than that of the other top roller 13 in such a way as to allow a diversion of the transport branch 20, at a position denoted 23, and create an end portion 24 inclined downwards along the conveying direction, running in contact with a guide plate 25.

The infeed ends of the two conveyors 11 and 12 are positioned one above the other, with the inclined end portion 24 providing a link element between the main conveyor 10 and the infeed end presented by the transport branch 22 of the lower conveyor 12. The infeed end presented by the transport branch 20 of the upper conveyor 11 is positioned above the infeed end of the lower conveyor 12, at a distance not less than the thickness of a single soap bar 3.

Numeral 26 denotes linking means located between the top branch 15 of the main conveyor 10 and the top branch 20 of the upper conveyor 11, extending from the aforementioned position 23 immediately upstream of the inclined portion 24 to the infeed end of the latter conveyor 11, which provide cyclically operated transfer means positioned to engaged the soap bars 3 and comprise two conveyors 27 and 28 disposed parallel one with another.

Each conveyor 27 and 28 comprises a respective belt 29 and 30, looped around two end rollers rotatable about vertical axes, denoted 29a and 29b in the case of the one belt 29, and denoted 30a and 30b in the case of the other belt 30.

The two rollers denoted 29a and 30a are driven by a motor 31 in such a way that the two mutually opposed branches 32 and 33 of the belts 29 and 30, which combine to create a channel 34, move in a common direction coinciding with the feed direction of the main conveyor 10.

The outer surfaces presented by the belts 29 and 30 of the two conveyors 27 and 28 are faced with a layer 35 of material, for example a resilient material, covering substantially half of their developable length.

In a first half cycle during each complete transfer cycle completed by the two conveyors 27 and 28, the width of the channel 34 is greater than the transverse dimension, denoted L, of the bars of soap 3, whereas in the second half cycle, when the layers 35 of resilient material occupy the channel 34, the width of the channel is marginally less than the transverse dimension L.

In operation, products 3 are transferred by the main conveyor 10 from the moulding machine 2 to the two conveyors 11 and 12, advancing in continuous single file 8 on the top transport branch 15 suspended between the two top rollers 13 and 14.

When a first soap bar 3 of the file 7 advancing on the top branch 15 reaches the position 23 coinciding with the entry point of the channel 34 at the start of the first half cycle (see FIG. 2), a group 36 consisting in a certain number of soap bars 3 not held between the two branches 32 and 33, as explained above, will be free to proceed along the inclined end portion 24 and reach the lower conveyor 12 supplying the packaging machine denoted 5.

With the two conveyors 27 and 28 in operation, at the end of the first half cycle and at the beginning of the second half cycle, the channel 34 will assume the configuration of FIG. 3, whereupon the soap bars 3 arriving at the position denoted 23 are restrained by their respective ends through the combined action of the two mutually opposed layers 35 of resilient material, and a group 36 comprising a number of products equal to that of the previous group will be directed along the channel 34, then along the upper conveyor 11 and into the corresponding packaging machine 4.

Consequently, the single file 7 is divided by groups 36 into equal parts, distributed between the two conveyors 11 and 12, without the soap bars 3 being subjected to impact or frictional contact, since there is absolutely no relative movement between the products and the conveying means, and no impact of the products against fixed diverter means, as is the case with prior art devices.

The device according to the present invention can also be used, when necessary, to obtain a different distribution of products between the two packaging machines 4 and 5.

For example, the belts 29 and 30 of the two conveyors 27 and 28, which in the example of FIGS. 2 and 3 are faced with a layer 35 of resilient material extending substantially along half of their developable length, might be replaced with belts presenting a longer or shorter length of resilient facing material, depending on whether a greater or a lesser number of products is to be supplied to the one packaging machine 4 or to the other packaging machine 5.

A different distribution of products 3 between the two packaging machines 4 and 5 might also be obtained, through the agency of a master control unit 37, by programming a pause of given duration within the transfer cycle, coinciding with the inactive phase of the belts 29 and 30, during which the motor 31 of the linking means 26 remains idle.

It will be evident that in this situation, the number of products directed along the lower conveyor 12 to the one packaging machine 5 will be greater, by a margin depending on the duration of the pause, than the number supplied to the other packaging machine 4.

Figure 4:
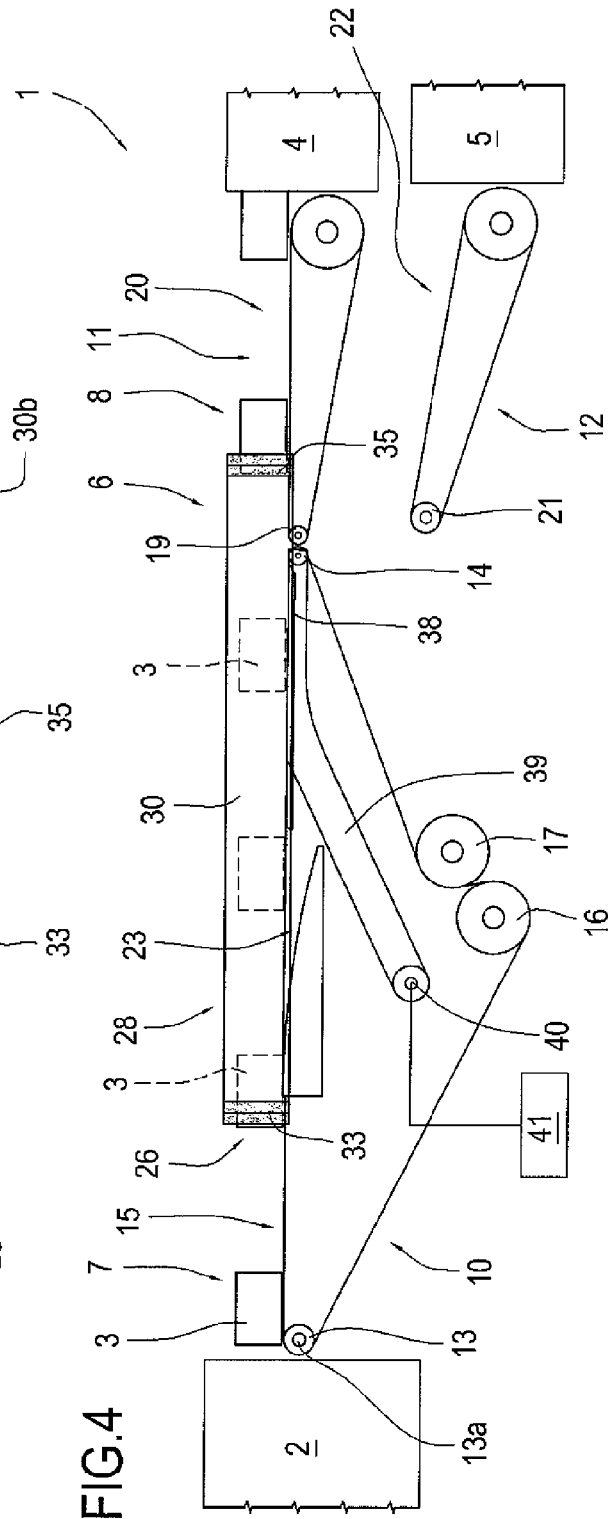

In the example of FIGS. 4 and 5, the inclined end portion 24 of the transport branch 15 is capable of movement between the position linking the main conveyor 10 with the lower conveyor 12, described previously, and a position linking the main conveyor 10 directly with the upper conveyor 11.

In this instance, the end portion 24 of the top branch 15 is supported by a guide plate 38 associated rigidly with the end of an arm 39 mounted to a pivot 40 of which the axis lies parallel to the axis 13a of the top roller 13, and able thus to rock between the two positions aforementioned when shifted by actuator means 41 interlocked to the master control unit 37.

In the configuration of FIG. 5, that is to say with the arm 39 occupying the lower position, the device 6 according to the present invention operates in the manner already described.

In the situation of FIG. 4, with the arm 39 elevated to the upper position and the belts 29 and 30 currently motionless in the configuration whereby the channel 34 is rendered inactive, all products 3 emerging from the moulding machine 2 will run through freely to the packaging machine denoted 4.

To resume the supply of products to the other machine 5, a signal is generated by the master control unit 37 to set the conveyors 27 and 28 of the channel 34 in motion, followed by a signal to rotate the arm 39 clockwise (as viewed in FIG. 4).

As a result, the final products 3 advancing toward the upper packaging machine 4, no longer supported by the end portion 24 of the main conveyor 10 as the arm 39 drops to the lower operating position, are held between the belts 29 and 30 and thus carried by the channel 34 onto the relative conveyor 11 (FIGS. 5 and 6).

Figure 7:
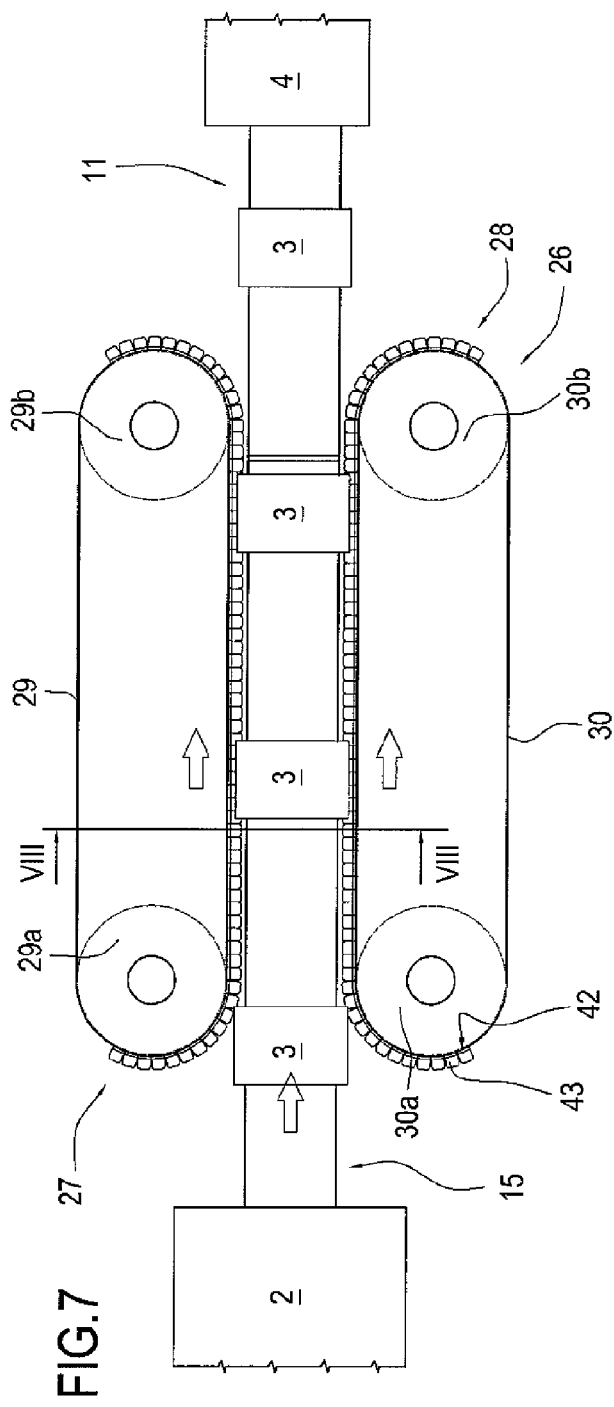
FIG. 7 illustrates a further embodiment of the device according to the invention, viewed in plan.
Figure 8:
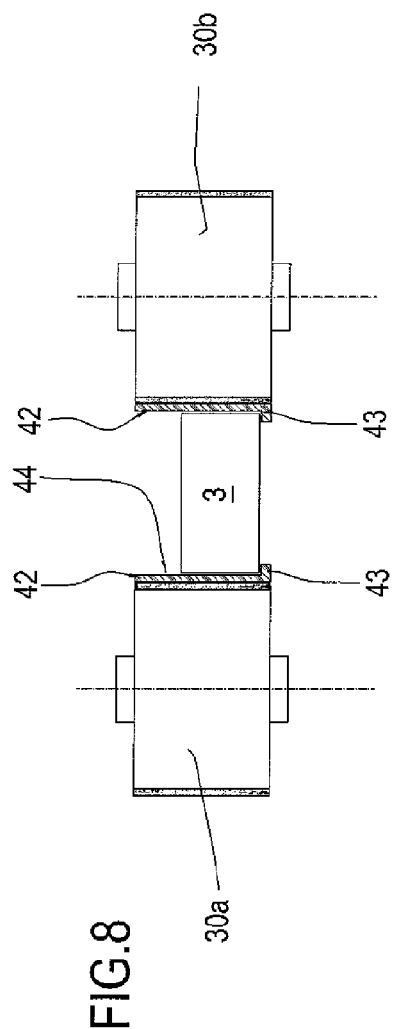
FIG. 8 shows a detail of FIG. 7, viewed in section and with certain parts omitted for clarity.

In the example of FIGS. 7 and 8, the two belts 29 and 30 of the cyclically operated linking means 26 are equipped externally along a given portion of their developable length, not with a layer 35 of resilient material by which products 3 advancing along the channel 34 are gripped laterally, but with a plurality of L-shaped elements denoted 42, each presenting an outwardly directed horizontal arm denoted 43.

The L-shaped elements 42 combine to form a plurality of mutually opposed pairs ordered along the channel 34 and affording a cradle 44 by which a product 3 can be retained and supported.

The invention claimed is:

1. A device for dividing a single file of products into at least two files, comprising:
   a main conveyor transporting the single file of products;
   a first outfeed conveyor having an infeed end and a second outfeed conveyor having an infeed end, the first and second outfeed conveyors transporting the at least two files of products;
   a linking mechanism interposed between the main conveyor and at least one of the infeed ends of the outfeed conveyors, movable between an active configuration of supporting and transferring the products and an inactive configuration of disengagement from the products;
   wherein the infeed end of the first outfeed conveyor and the infeed end of the second outfeed conveyor are positioned at different heights, and the linking mechanism is interposed between the main conveyor and an uppermost one of the infeed ends;
   wherein the linking mechanism comprises two belt conveyors looped around end rollers turning on vertical axes, and combining to create a channel by which the main conveyor is connected to the uppermost one of the infeed ends;
   wherein an outer surface of at least one of the belt conveyors includes, along a portion of predetermined length, a mechanism for gripping the products when the mechanism for gripping the products passes along the channel;
   wherein the main conveyor includes an end portion that moves from a first position adjacent the infeed end of the first outfeed conveyor to a second position adjacent the infeed end of the second outfeed conveyor.

2. The device of claim 1, wherein the mechanism for gripping the products comprises a layer of facing material.

3. The device of claim 1, wherein the linking mechanism moves according to a cyclical law of motion.

4. The device of claim 1, and further comprising a control unit for creating a pause within the transfer cycle, to obtain a different distribution of products directed along the first outfeed conveyor with respect to the second outfeed conveyor.

5. The device of claim 4, wherein the control unit generates a signal to set the belt conveyors in motion, followed by a signal to move the end portion of the main conveyor from a lowermost one of the infeed ends to an uppermost one of the infeed ends.

6. The device of claim 1, and further including a driven pivoting mechanism that pivots the end portion between the infeed ends of the two outfeed conveyors.

7. The device of claim 1, and further including a driven pivoting mechanism that pivots the end portion between the infeed ends of the two outfeed conveyors.

8. The device of claim 2, wherein the layer of facing material is a resilient material.

9. A device for dividing a single file of products into at least two files, comprising:
   a main conveyor transporting the single file of products;
   a first outfeed conveyor having an infeed end and a second outfeed conveyor having an infeed end, the first and second outfeed conveyors transporting the at least two files of products;
   a linking mechanism interposed between the main conveyor and at least one of the infeed ends of the outfeed conveyors, movable between an active configuration of supporting and transferring the products and an inactive configuration of disengagement from the products;
   wherein the infeed end of the first outfeed conveyor and the infeed end of the second outfeed conveyor are positioned at different heights, and the linking mechanism is interposed between the main conveyor and an uppermost one of the infeed ends;
   wherein the linking mechanism comprises two belt conveyors looped around end rollers turning on vertical axes, and combining to create a channel by which the main conveyor is connected to the uppermost one of the infeed ends;
   wherein an outer surface of at least one of the belt conveyors includes, along a portion of predetermined length, a plurality of L-shaped elements forming a cradle for retaining and supporting the products when the L-shaped elements pass along the channel;
   wherein the main conveyor includes an end portion that moves from a first position adjacent the infeed end of the first outfeed conveyor to a second position adjacent the infeed end of the second outfeed conveyor.

10. The device of claim 9, and further comprising a control unit for creating a pause within the transfer cycle, to obtain a different distribution of products directed along the first outfeed conveyor with respect to the second outfeed conveyor.

11. The device of claim 10, wherein the control unit generates a signal to set the belt conveyors in motion, followed by a signal to move the end portion of the main conveyor from a lowermost one of the infeed ends to an uppermost one of the infeed ends.

12. The device of claim 11, wherein the linking mechanism moves according to a cyclical law of motion.

13. The device of claim 9, wherein the linking mechanism moves according to a cyclical law of motion.

14. A device for dividing a single file of products into at least two files, comprising:
   a main conveyor transporting the single file of products;
   a first outfeed conveyor having an infeed end and a second outfeed conveyor having an infeed end, the first and second outfeed conveyors transporting the at least two files of products;
   a linking mechanism interposed between the main conveyor and at least one of the infeed ends of the outfeed conveyors, movable between an active configuration of supporting and transferring the products and an inactive configuration of disengagement from the products;
   wherein the infeed end of the first outfeed conveyor and the infeed end of the second outfeed conveyor are positioned at different heights, and the linking mechanism is interposed between the main conveyor and an uppermost one of the infeed ends;
   wherein the linking mechanism comprises two belt conveyors looped around end rollers turning on vertical axes, and combining to create a channel by which the main conveyor is connected to the uppermost one of the infeed ends;
   wherein an outer surface of at least one of the belt conveyors includes, along a portion of predetermined length, a mechanism for gripping the products when the at least one of the belt conveyors passes along the channel;
   a control unit for creating a pause within the transfer cycle, to obtain a different distribution of products directed along the first outfeed conveyor with respect to the second outfeed conveyor.

15. The device of claim 14, wherein the control unit generates a signal to set the belt conveyors in motion, followed by a signal to move the end portion of the main conveyor from a lowermost one of the infeed ends to an uppermost one of the infeed ends.

* * * * *